US008782634B2

(12) United States Patent
Ushiku

(10) Patent No.: US 8,782,634 B2
(45) Date of Patent: Jul. 15, 2014

(54) INSTALLATION METHOD AND APPARATUS

(75) Inventor: Toyohiko Ushiku, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1498 days.

(21) Appl. No.: 11/410,111

(22) Filed: Apr. 25, 2006

(65) Prior Publication Data

US 2007/0234349 A1 Oct. 4, 2007

(30) Foreign Application Priority Data

May 17, 2005 (JP) ................ 2005-144225

(51) Int. Cl.
*G06F 9/445* (2006.01)

(52) U.S. Cl.
USPC .......................................... 717/174

(58) Field of Classification Search
USPC ......................... 717/168–178, 166
See application file for complete search history.

(56) References Cited

U.S. PATENT DOCUMENTS

| | | | | | |
|---|---|---|---|---|---|
| 6,138,153 | A | * | 10/2000 | Collins et al. ................. | 709/221 |
| 6,301,707 | B1 | * | 10/2001 | Carroll et al. ................. | 717/177 |
| 6,779,028 | B1 | | 8/2004 | Nakamura ..................... | 709/223 |
| 6,966,060 | B1 | * | 11/2005 | Young et al. ................... | 717/177 |
| 7,100,159 | B2 | * | 8/2006 | Claiborne ...................... | 717/174 |
| 7,152,109 | B2 | * | 12/2006 | Suorsa et al. .................. | 709/226 |
| 7,240,336 | B1 | * | 7/2007 | Baker ............................ | 717/135 |
| 7,366,589 | B2 | * | 4/2008 | Habermas ...................... | 701/1 |
| 7,523,116 | B2 | * | 4/2009 | Yan ................................ | 1/1 |
| 7,549,149 | B2 | * | 6/2009 | Childress et al. ............. | 717/177 |
| 7,707,571 | B1 | * | 4/2010 | Harris et al. .................. | 717/177 |
| 7,987,459 | B2 | * | 7/2011 | Chow et al. ................... | 717/168 |
| 8,117,607 | B2 | * | 2/2012 | Albot et al. ................... | 717/162 |
| 2002/0138666 | A1 | * | 9/2002 | Fujisawa ....................... | 709/330 |
| 2002/0184619 | A1 | | 12/2002 | Meyerson | |
| 2003/0037327 | A1 | * | 2/2003 | Cicciarelli et al. ............ | 717/178 |
| 2003/0163807 | A1 | * | 8/2003 | Drake et al. .................. | 717/174 |
| 2003/0172175 | A1 | | 9/2003 | McCormack et al. ........ | 709/232 |
| 2003/0181193 | A1 | | 9/2003 | Wilhelmsson et al. | |
| 2004/0015961 | A1 | * | 1/2004 | Chefalas et al. .............. | 717/178 |
| 2004/0019889 | A1 | * | 1/2004 | Melchione et al. ........... | 717/177 |
| 2004/0139177 | A1 | | 7/2004 | Yook ............................. | 709/220 |
| 2005/0060722 | A1 | * | 3/2005 | Rochette et al. ............... | 719/319 |
| 2005/0192984 | A1 | * | 9/2005 | Shenfield et al. ............. | 707/100 |
| 2008/0172665 | A1 | * | 7/2008 | McIlroy ........................ | 717/177 |

FOREIGN PATENT DOCUMENTS

| | | |
|---|---|---|
| CN | 1516008 | 7/2004 |
| GB | 2392263 A | 2/2004 |
| JP | 2004-318459 | 11/2004 |
| KR | 1020040086330 | 10/2004 |

OTHER PUBLICATIONS

"The Apache Jakarta Project Application Developer's Guide" (Apache Project, Dec. 1, 2005).
"OSGI Service Platform Specification Release 2" (OSGI, 2001).
European Search Report dated Dec. 11, 2008 in corresponding European Patent Application No. 06113161.1.
Korean Official Action dated Mar. 27, 2008 in Korean Application No. 10-2006-0044085.

* cited by examiner

*Primary Examiner* — Jue Louie
(74) *Attorney, Agent, or Firm* — Fitzpatrick, Cella, Harper & Scinto

(57) ABSTRACT

Upon installing an application, one of a plurality of frameworks determines a framework in which the application is to be installed, and installs the application in the determined framework.

22 Claims, 16 Drawing Sheets

F I G. 7 target : Tomcat 5.5
......

FIG. 9

```
package com. canon. upd ;
public interface Application {
    public String getApplicationID( ) ;
    public URL getLocation ( ) ;
    . . . .
}
```

```
package com. canon. upd ;
public interface ApplicationManager {
    public Application install (InputStream in) ;
    public void start (String id) ;
    public void stop (String id) ;
    public void uninstall (String id) ;
    public void update (String id, InputStream in) ;
    public void setLicense (String id, String license ;
}
```

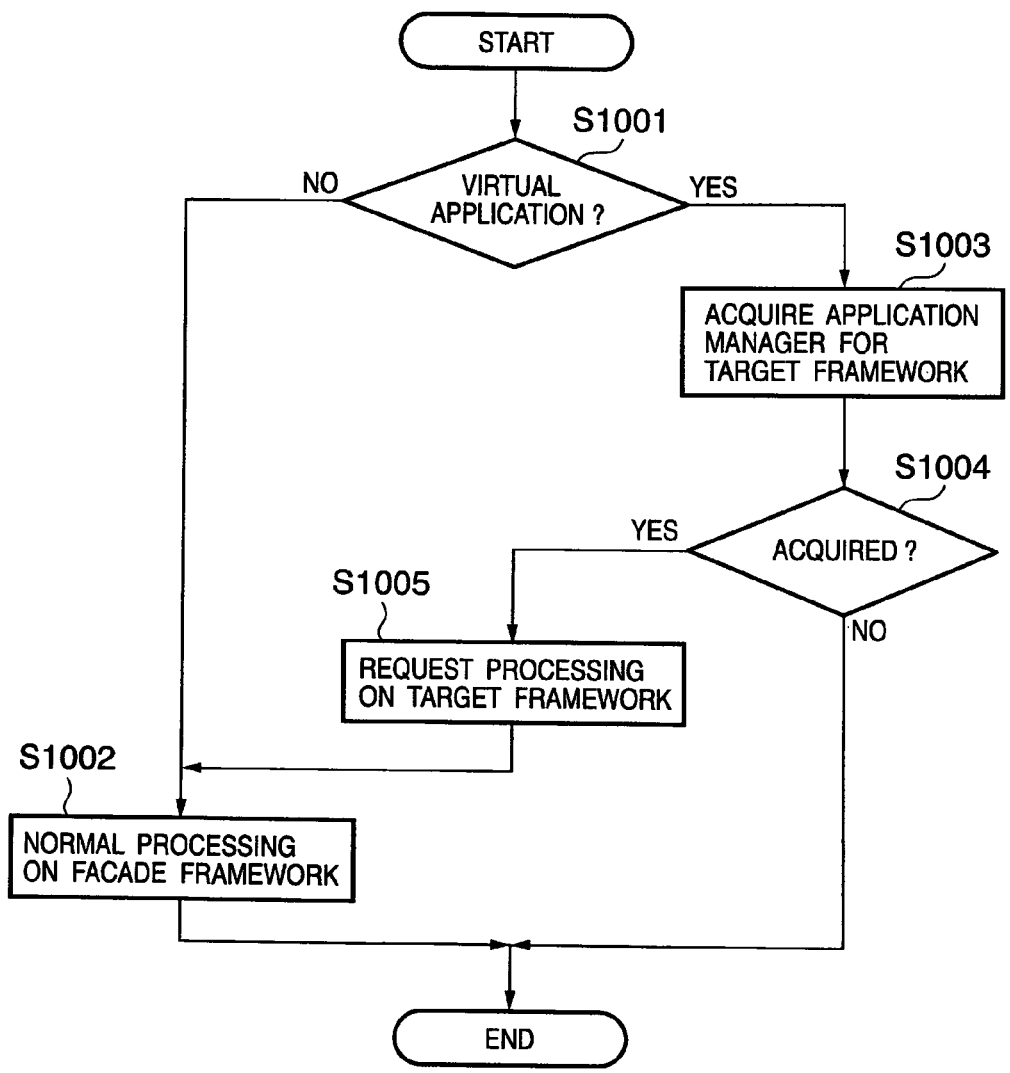

F I G. 13

```
<?xml version="1.0" encoding="utf-8" ?>
<application>
  <portion target="Tomcat 5.5" id="portion1">
  </portion>
     ......
</application>
```

FIG. 15

```
public Class FrameworkProgram {
    String frameworkId ;
    Application application ;
    int status ;
    ......
}
```

```
public Class ApplicationAttribute {
    String applicationId ;
    int status ;
    URL location ;
    Vector frameworkList ;
    ......
}
```

INSTALLATION METHOD AND APPARATUS

FIELD OF THE INVENTION

The present invention relates to a method and apparatus for installing an application.

BACKGROUND OF THE INVENTION

Conventionally, there are many kinds of software called a framework, platform, application server, program container, and the like, which are used to perform execution control of application programs on, e.g., a server of a computer system. Such software will be generally referred to as a framework hereinafter.

This framework has a so-called "lifecycle management function of an application program". This "lifecycle management function of an application program" implements the following execution control.

installation of an application program to be executed on the framework uninstallation of an unwanted application program execution of an installed application program stop of an application program which is running updating of an installed application program, and so forth These management methods and forms of application programs to be installed on respective frameworks are different depending on frameworks.

As typical frameworks, "The Apache Jakarta Tomcat 5.5 Servlet/JSP Container UserGuide" (Apache Project, 2004) and "OSGi Service Platform Specification Release 2" (OSGI, 2001) are known.

In "The Apache Jakarta Tomcat 5.5 Servlet/JSP Container UserGuide", a distribution format of an application program called a WAR format is prevalent. If this WAR file is stored in a specific directory, it is recognized that a new WAR file is stored, and that file is automatically converted into an executable form, thus implementing installation. Also, an application which manages the lifecycle of an application program using this mechanism is supported, and an application program can be installed/uninstalled/started/stopped, and so forth from a remote.

In "OSGi Service Platform Specification Release 2", a unit of application program called "bundle" is defined, and a form of a bundle file that forms this bundle is also defined. A lifecycle management function is provided for these bundles.

On the other hand, in a system called "embedded device" other than a general-purpose computer, along with an increase in speed and capacity of hardware resources of the device, technologies developed by the general-purpose computer are to be used in the embedded device in many cases.

In a server of a general-purpose computer system operators who manage hardware and software of the server have received professional educations. Therefore, even when the management method of an application program is different depending on frameworks, if it is assumed that they have skills to cope with such differences, no problem is posed.

On the other hand, in the embedded device, it is not expected in most cases that a person who has high professional skills is designated as an operator who actually manages the device.

Therefore, when the management method of an application program is different for respective frameworks, operation errors are more likely to occur due to inexperience and lack of technical knowledge. That is, the entire system is more likely to cause functional disturbance. Also, it can be hardly said that even the operator who manages the server be free of operation errors.

Also, license management, security check, and the like of application programs are often normally made at the time of installation. Therefore, if an installation method as a part of the lifecycle management method of an application program is different for respective frameworks, a plurality license management functions and security check functions must be prepared in the system. That is, the use efficiency of hardware resources undesirably lowers.

In addition, network approach paths for remote control must be open to outside for respective frameworks, and there are many routes that may allow encroachment from outside into the system. Hence, such routes may become a bottleneck in terms of security.

SUMMARY OF THE INVENTION

The present invention has been made to solve the aforementioned problems.

It is an object of the present invention to prevent operation errors of an operator.

It is another object of the present invention to protect external encroachment.

It is still another object of the present invention to provide an installation method which is executed by one of a plurality of frameworks, determines, upon installation of an application, in which of frameworks the application is to be installed, and installs the application in the framework in which the application is determined to be installed in the determination step.

It is yet another object of the present invention to provide an information processing apparatus which comprises determination means for determining, upon installation of an application, in which of a plurality of frameworks the application is to be installed, and installation means for installing the application in the framework in which the application is determined to be installed by the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows a description example of a program attribute in the first embodiment;

FIG. 9 shows an example of an interface in the first embodiment;

FIG. 10 is a flowchart showing the stop processing of an application in the first embodiment;

FIG. 13 shows a description example of a program attribute in the third embodiment;

FIG. 15 shows an example of an ApplicationAttribute object in the third embodiment.

DETAILED DESCRIPTION OF THE PREFERRED EMBODIMENTS

Preferred embodiments of the present invention will be described in detail hereinafter with reference to the accompanying drawings.

The arrangement and operation of an embedded device in which a plurality of frameworks are embedded will be described below using FIG. 1. Note that the present invention is not limited to the embedded device.

Figure 1:
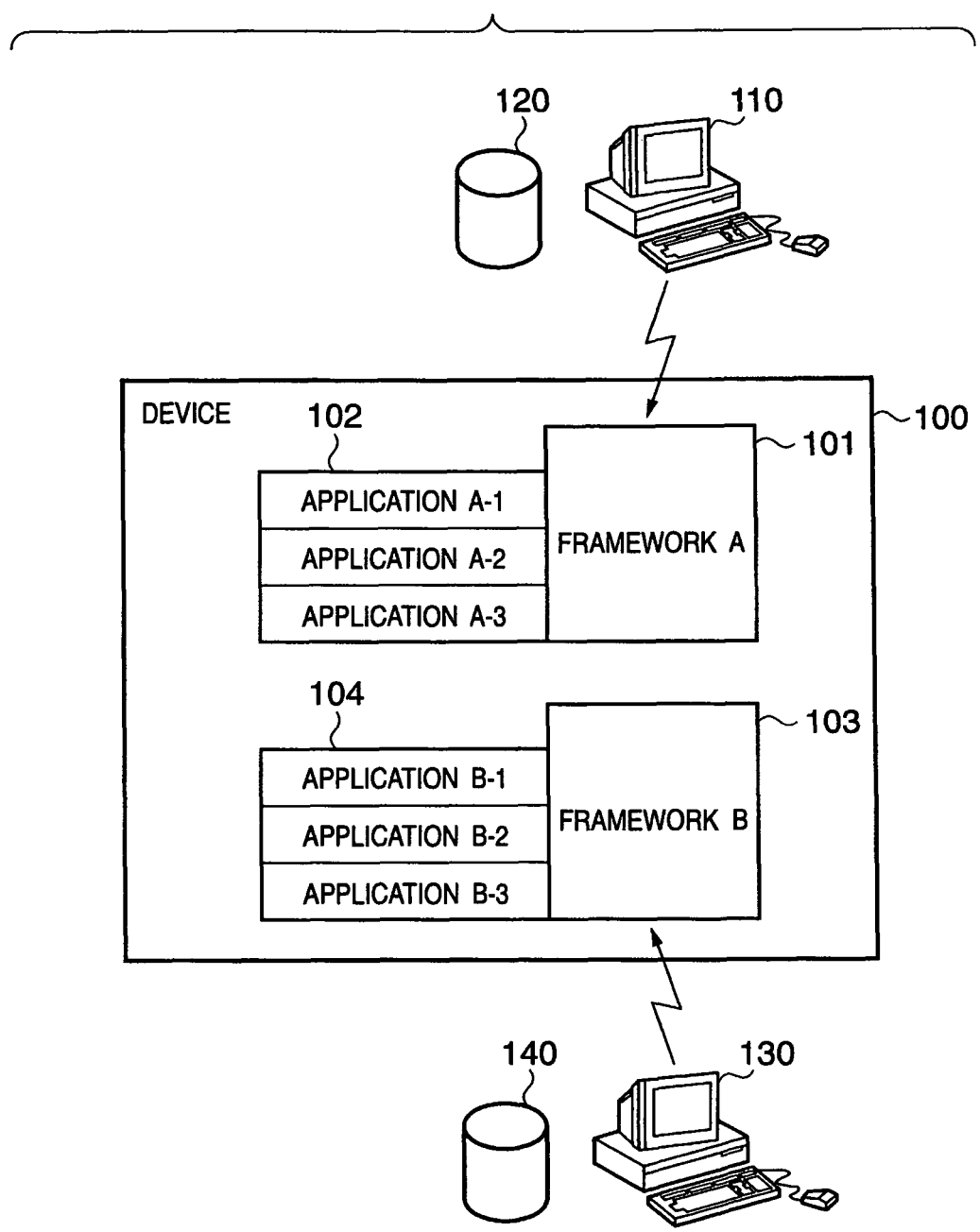
FIG. 1 is a view showing an example of the arrangement of a general embedded device.

FIG. 1 is a view showing an example of the arrangement of a general embedded device. Referring to FIG. 1, reference numeral 100 denotes an embedded device (to be abbreviated as "device" hereinafter) on which frameworks run. Reference numeral 101 denotes a framework A as a framework which runs on the device 100. Reference numeral 102 denotes an application group A as applications to be managed on the framework A 101. Reference numeral 110 denotes a computer A which instructs the framework A 101 to manage the applications. Reference numeral 120 denotes an application A which is to be installed in the framework A 101 via the computer A 110.

Reference numeral 103 denotes a framework B as a framework which runs on the device 100. Reference numeral 104 denotes an application group B as applications to be managed on the framework B 103. Reference numeral 130 denotes a computer B which instructs the framework B 103 to manage the applications. Reference numeral 140 denotes an application B which is to be installed in the framework B 103 via the computer B 130.

These application program management functions can be controlled from a remote (the computer A 110 or the computer B 130) using a WWW (World Wide Web) technique. That is, using a Web browser which runs on a computer different from the device 100 on which the framework (A 101 or B 103) is actually started, the framework (A 101 or B 103) in the device 100 is accessed from a remote. The lifecycles of application programs (A 102 or B 104) on the framework (A 101 or B 103) can be managed.

Figure 2:
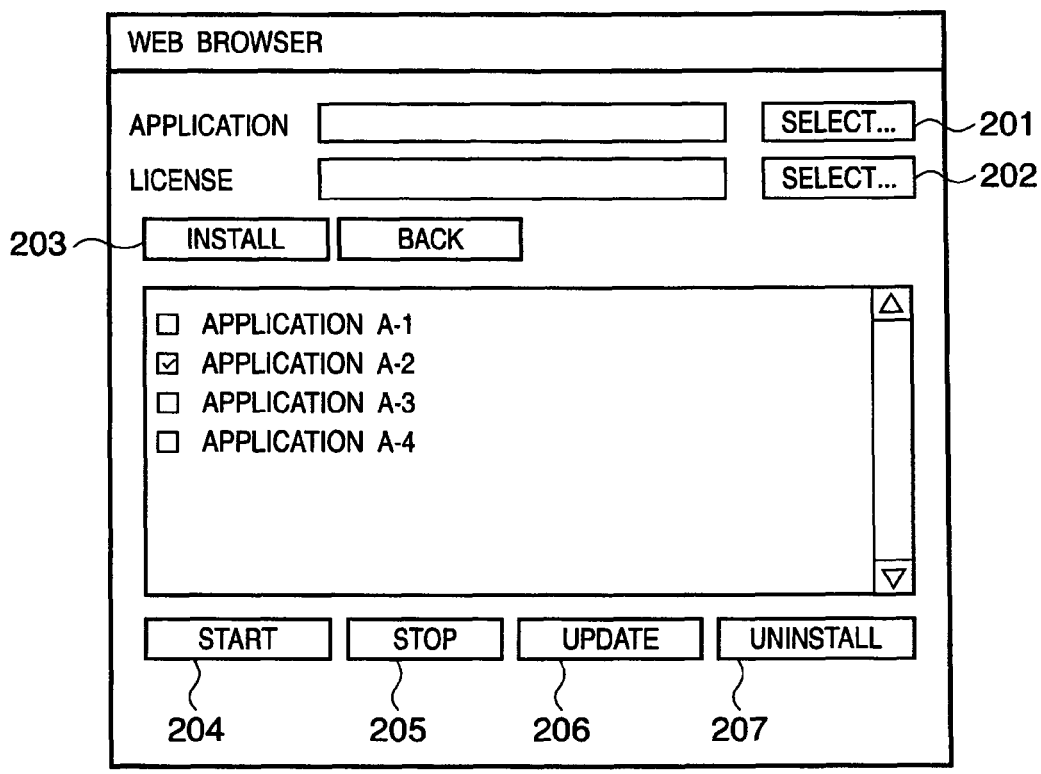
FIG. 2 shows an example of a management window displayed on a computer by a Web browser.

FIG. 2 shows an example of a management window displayed on a computer by a Web browser. This example is an application program management window which is displayed by a Web browser that runs on the computer A 110 when the computer A 110 manages the application program group A 102 on the framework A 101.

The user of the computer A 110 selects a file that stores an application using a select button 201 from this management window. After the user designates a file that stores license information using a select button 202, he or she starts installation using an installation button 203.

Also, the user selects an installed application (e.g., application A-2) from this management window, and instructs execution control such as start 204/stop 205/update 206/uninstall 207, etc.

On the other hand, the framework B 103 installs an application by transferring the application B 140 to a specific directory assured by the framework B 103 using FTP (File Transfer Protocol). Uninstallation is done by deleting a file from the specific directory using FTP as in installation.

In this way, even the frameworks A 101 and B 103 on the identical device 100 have different application program management methods.

Note that the computers A 110 and B 130 are described as different computers for the sake of descriptive convenience, but they may be a single computer.

First Embodiment

A method of uniformly managing the lifecycles of application programs on the device on which a plurality of frameworks run will be described below.

Figure 3:
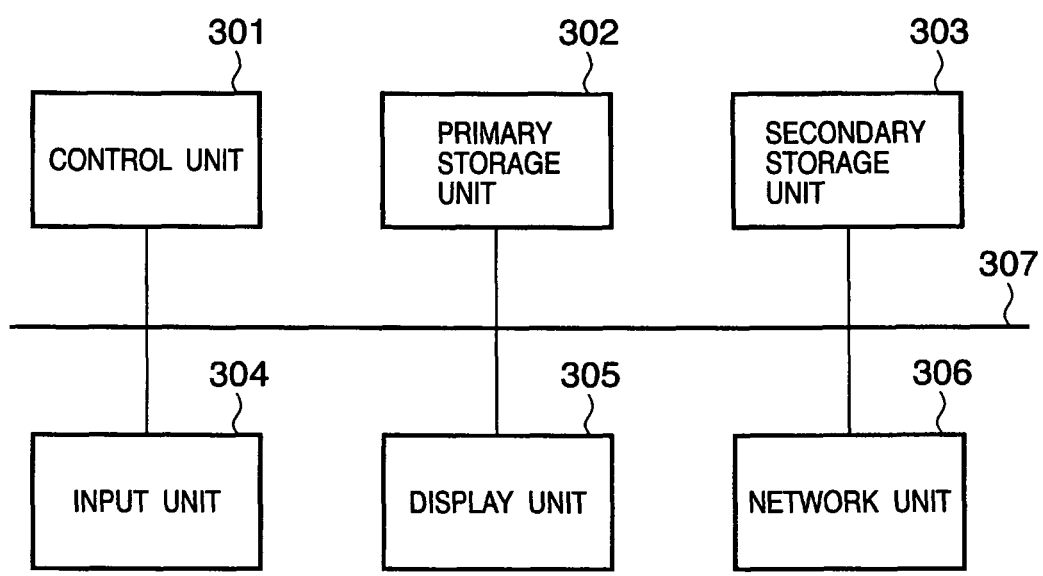
FIG. 3 is a block diagram showing an example of the arrangement of an embedded device in the first embodiment.

FIG. 3 is a block diagram showing an example of the arrangement of the embedded device in the first embodiment. Note that the present invention is not limited to the embedded device, and can be applied to other network devices.

Referring to FIG. 3, reference numeral 301 denotes a control unit which controls the overall device. Reference numeral 302 denotes a primary storage unit which comprises a RAM or the like and is used to temporarily store data and software to be executed by the control unit 301. Reference numeral 303 denotes a secondary storage unit which comprises a hard disk or the like and is used to permanently store data and software to be executed by the control unit 301. Reference numeral 304 denotes an input unit which comprises a keyboard, mouse, touch screen, scanner, and the like and is used to input user's instructions, text data, and image data. Reference numeral 305 denotes a display unit which comprises a display and is used to display instructions to an operator and data contents. Reference numeral 306 denotes a network unit which comprises a LAN and the like and is used to communicate with other devices. Reference numeral 307 denotes a bus which interconnects the respective units.

Figure 4:
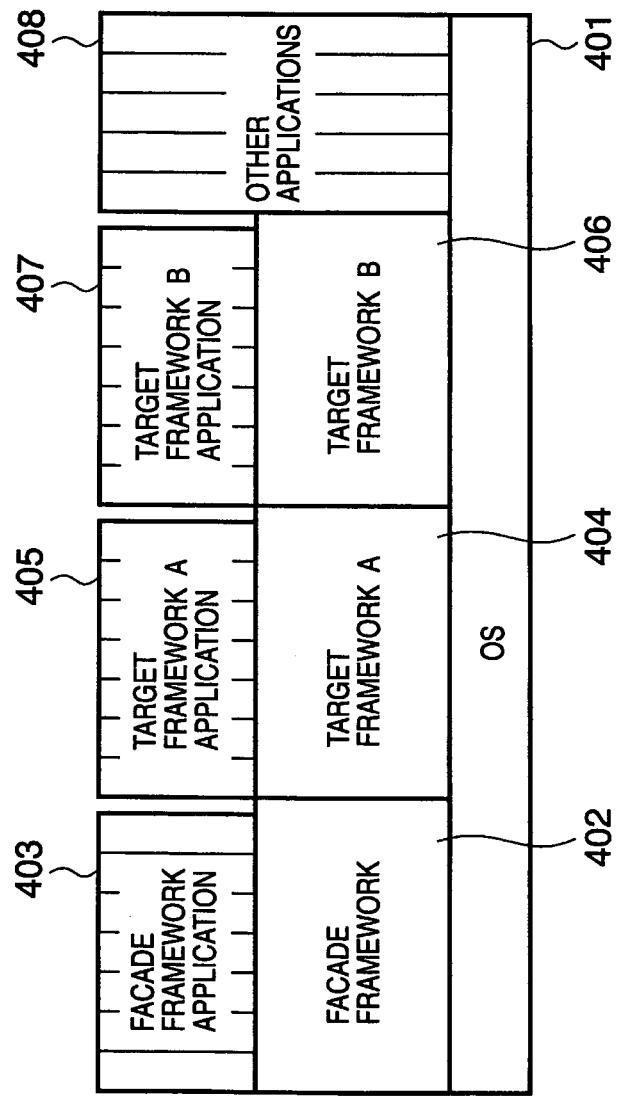
FIG. 4 is a view hierarchically showing the configuration of software to be executed by a control unit 301.

FIG. 4 hierarchically shows the configuration of software to be executed by the control unit 301. Referring to FIG. 4, reference numeral 401 denotes an operating system (OS) used to manage software and hardware resources. Reference numeral 402 denotes a facade framework which receives operator's instructions as a representative of frameworks that serve as execution environments of applications. Reference numeral 403 denotes a facade framework application group which runs on the facade framework 402.

Reference numeral 404 denotes a target framework A as a framework which receives operator's instructions via the facade framework 402. Reference numeral 405 denotes a target framework A application group which runs on the target framework A 404. Reference numeral 406 denotes a target framework B which receives operator's instructions via the facade framework 402 as in the target framework A 404. Reference numeral 407 denotes a target framework B application group which runs on the target framework B 406. Reference numeral 408 denotes another application group which runs on the OS 401.

Note that the facade framework 402, target framework A 404, and target framework B 406 are handled equally to applications that belong to the other application group 408 from the OS 401.

In the first embodiment, the facade framework 402 will be explained as an expanded one of OSGi Service Platform (to be abbreviated as OSGi hereinafter).

The facade framework 402 is built up with Java (Java is the registered trade name of Sun Microsystems Inc. of U.S.A.). Each application is called a bundle, and is provided as a Jar (Java ARchive) as an archive file format. The facade framework 402 has service registration, search, and use functions of providing some functions of a given application to another application. With these functions, a service having a specific interface can be searched and used. In the service registration function, an attribute that specifies a service to be registered can be registered together, and a service having a specific attribute value can be searched and acquired based on that attribute. Note that details of OSGi are described in "OSGi Service Platform Specification Release 2" described above, and a description thereof will be omitted.

Figure 5:
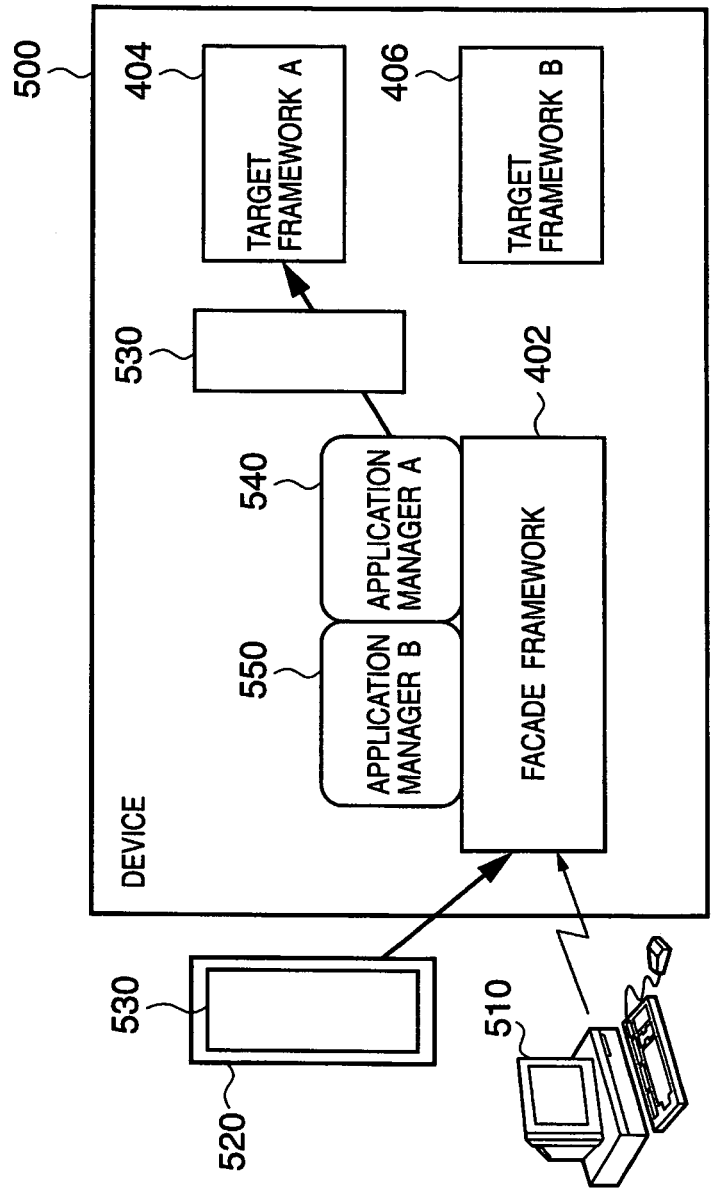
FIG. 5 is a view illustrating the relationship between a facade framework 402 and target framework A 404.

FIG. 5 illustrates the relationship between the facade framework 402 and target framework A 404. Referring to FIG. 5, reference numeral 500 denotes a device in the first embodiment, which comprises respective units shown in FIG. 3. Reference numeral 510 denotes a computer which is connected to the device 500 via the network unit 306. Reference numeral 520 denotes an application file which is stored in a storage device of the computer 510 and includes a target application to be installed in the target framework A 404 via the facade framework 402. Reference numeral 530 denotes a target application which is included in the application file 520 and runs on the target framework A 404.

Even when the facade framework 402 and the target frameworks 404 and 406 are respectively prepared in different devices, the present invention can be applied. In this case, the facade framework 402 prepared in a given device installs a target application in the target framework 404 or 406 prepared in another device.

The structure of the application file 520 in the first embodiment will be described below using FIG. 6.

Figure 6:
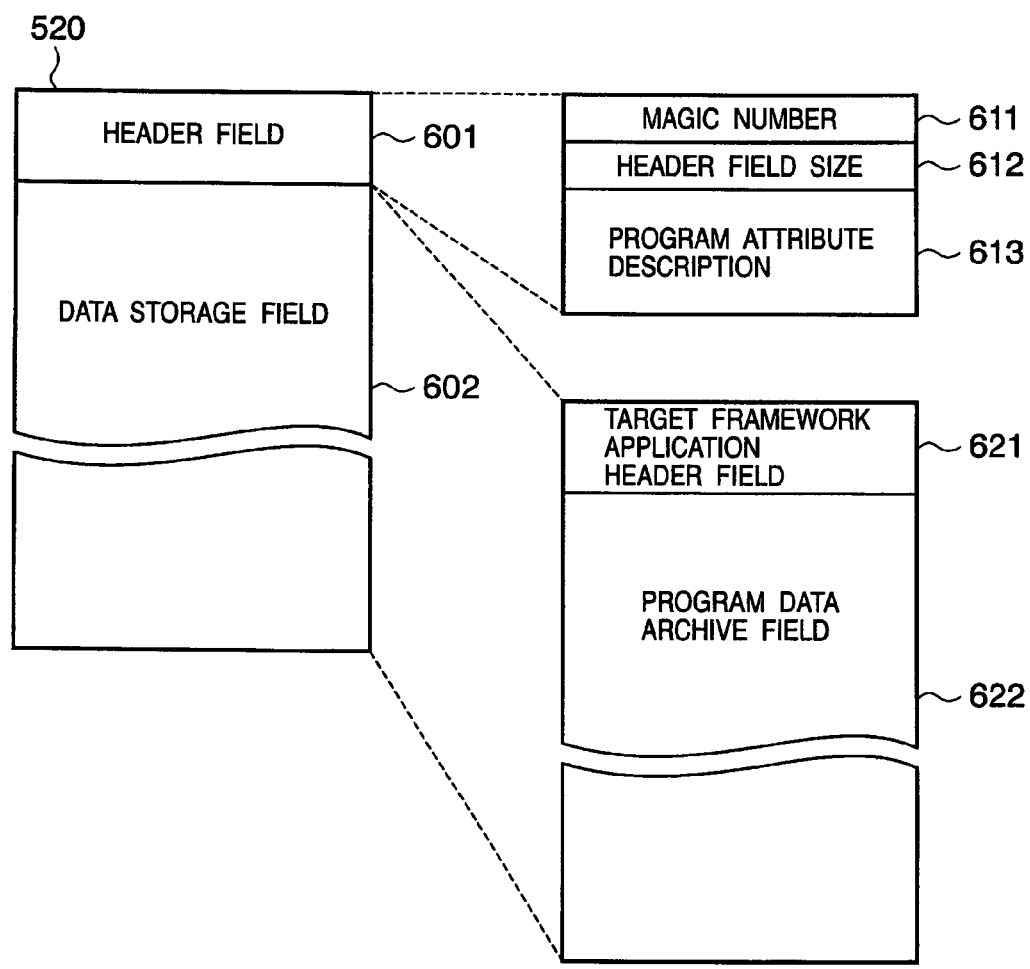
FIG. 6 shows an example of the structure of an application file 520 in the first embodiment.

FIG. 6 shows an example of the structure of the application file 520 in the first embodiment. As shown in FIG. 6 the application file 520 has a header field 601 and data storage field 602.

Figure 7:
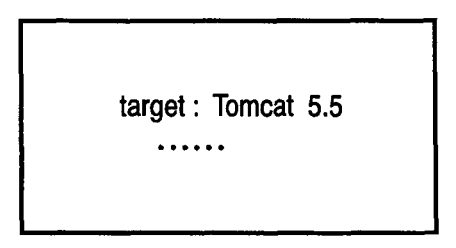

The header field 601 includes a magic number 611 indicating the application file, a header field size 612 indicating the size of the header field 601, and a program attribute description field 613 which describes various attributes of the application program. Note that the program attribute description field 613 has a manifest header format of a Jar file which expresses a program attribute, as shown in FIG. 7. Note that the manifest header describes an attribute value as a pair of the name and value of a given attribute.

On the other hand, the data storage field 602 is encrypted so as to be decrypted by only a secret key managed by the facade framework 402. When the data storage field 602 is decrypted, it is divided into a target framework application header field 621 and program data archive field 622. The target framework application header field 621 describes attributes required at the time of execution on the target framework A 404. The program data archive field 622 stores program data to be executed on the target framework.

Referring back to FIG. 5, reference numeral 540 denotes an application manager A which belongs to the facade framework application group 403, executed on the facade framework 402, and performs lifecycle management of applications with respect to the target framework A 404. Reference numeral 550 denotes an application manager B which belongs to the facade framework application group 403, executed on the facade framework 402, and performs lifecycle management of applications with respect to the target framework B 406. That is, the application managers that perform lifecycle management of applications exist in correspondence with the frameworks.

The processing executed when the operator of the computer 510 installs the application file 520 in the target framework A 404 will be described below using FIG. 8. Assume that the operator designates license information at the same time together with the application file 520. Also, as the user interface on the Web browser used in the first embodiment, the same management window as that shown in FIG. 2 is used.

Figure 8:
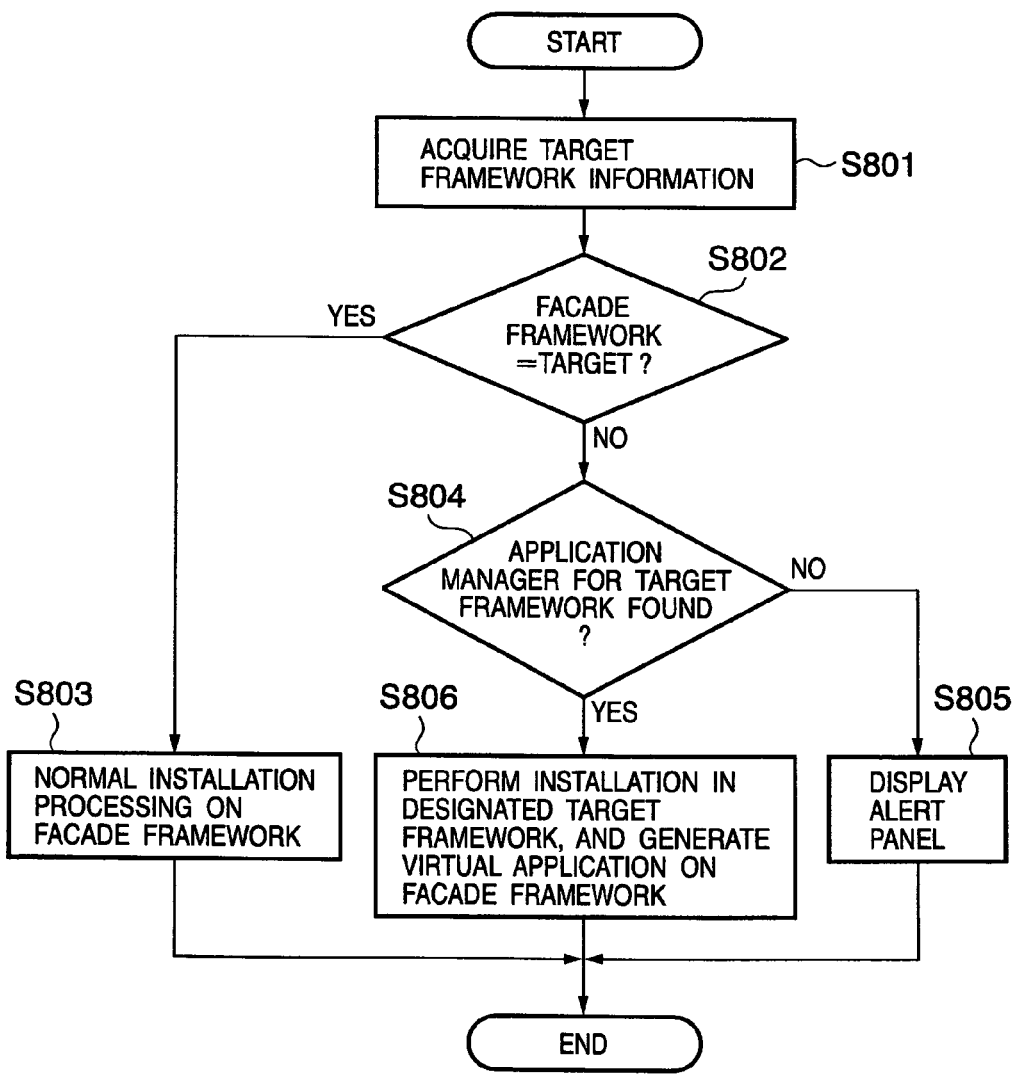
FIG. 8 is a flowchart showing installation processing in the first embodiment.

FIG. 8 is a flowchart showing the installation processing in the first embodiment. In step S801, the operator of the computer 510 accesses the facade framework 402 via a management user interface of the facade framework 402 in the device 500, which is displayed by the Web browser. The operator then instructs to install the application file 520.

Upon reception of the application file 520 in response to the operator's instruction, the facade framework 402 interprets the manifest header described in the program attribute description field 613 in the header field 601 of that application file 520. Then, the facade framework 402 acquires a framework which is to execute the program stored in the program data archive field 622 from the manifest header.

Note that the framework serving as a target is described as a target (target:) attribute, as shown in FIG. 7. When no target attribute is set or when the facade framework 402 is designated, the facade framework 402 is recognized as a target framework. In this case, "Tomcat 5.5" is designated as the target, and the target framework A 404 is recognized.

It is checked in step S802 if the target framework which is acquired in step S801 and is used to execute the application file 520 is the facade framework 402. If the target framework is the facade framework 402, the flow advances to step S803.

In step S803, the application file 520 which is designated by the operator and is sent from the computer 510 to the facade framework 402 is installed as an application for the facade framework 402.

Upon installation, data stored in the data storage field 602 of the application file 520 is decrypted using a secret key. The decrypted data is assumed to be an application for the facade framework 402 and undergoes installation processing in the facade framework 402.

Also, processing for checking whether or not the decrypted data is compliant with the format of an application of the facade framework 402 is implemented by the function of the facade framework 402. Furthermore, the license information designated by the operator is set as that for the facade framework 402.

On the other hand, if it is recognized in step S802 that a framework other than the facade framework 402 is a target framework, the flow advances to step S804 to search to see if an application manager for the recognized target framework exists. Note that the facade framework 402 and target frameworks may be prepared in different devices.

The application manager is registered as one which provides a service using an interface (ApplicationManager) shown in FIG. 9. As an attribute of the application manager, an identifier of a framework as a target is registered as a "TargetFramework" attribute.

In this example, it is recognized in step S801 that the target framework is "Tomcat 5.5". Therefore, when the name of the ApplicationManager interface and a search formula of its attribute value are designated in a search method provided by the facade framework 402 main body as follows in an LDAP format, the application manager for "Tomcat 5.5" can be acquired.

ApplicationManager am=(ApplicationManager) framework_body search ("com.canon.upd.ApplicationManager", "(TargetFramework=Tomcat 5.5)");

When no application manager for "Tomcat 5.5" is registered, null is returned to recognize that fact.

That is, if the target framework A 404 is "Tomcat 5.5", the application manager for the target framework A 404 can be acquired by the above search.

If the application manager for the target framework can be successfully acquired, the flow advances to step S806; if the application manager cannot be acquired and null is returned, the flow advances to step S805.

In step S805, an alert page indicating that no application manager corresponding to the target framework designated as an installation destination of the application is registered is displayed on the Web browser on the computer 510. This alert page informs the operator that the installation has failed.

If the application manager corresponding to the target framework designated as an installation destination of the application can be acquired in step S804, the flow advances to step S806. In this case, the application manager A 540 as that for the target framework A 404 is returned.

If the application manager exists, the flow advances to step S806 to extract the data storage field 602 from the application file 520 and to decrypt it using a secret key. The decrypted target application 530 is opened as an input stream, and an install method of the application manager A 540 is called out to have that stream as an argument to install the application in the target framework A 404.

In this case, since the target framework A 404 is Tomcat, data passed by the input stream is stored in a specific directory as a WAR file, thus executing installation processing.

Upon completion of installation in the target framework A 404, an object that implements the Application interface shown in FIG. 9 is returned. The object that implements the Application interface includes an application identifier used to uniquely recognize applications installed in the target framework A application group 405 on the target framework A 404.

The application identifier can be acquired by calling a getApplicationID method of the Application interface.

The target framework A 404 is notified of the license information designated by the application manager A 540, and that license information is used by the target framework A 404.

When a makeBundle method as an expanded method is called out using the acquired Application object and the identifier (a character string "Tomcat 5.5" in this example) of the target framework with respect to the main body of the facade framework 402, a virtual application is generated. This virtual application is the one generated on the facade framework 402, and corresponds to the application installed on the target framework A 404.

The subsequent lifecycle management of applications installed in the target framework A 404 is performed for this virtual application. In this way, execution control can be made as if the applications on the facade framework 402 were managed.

As described above, the application can be installed in the target framework A 404 as if it were installed in the facade framework 402 when viewed from the operator.

Processing other than installation will be described below. Respective processes other than installation are roughly the same, and the processing for stopping a running application will be described using FIG. 10 as a representative example.

FIG. 10 is a flowchart showing the stop processing of an application in the first embodiment. As in the aforementioned installation processing, the operator accesses the facade framework 402 from the computer 510 to display the management window of the application group 403 of the facade framework 402 on the Web browser. When the operator selects an application from the displayed management window and instructs to perform stop processing, the flow advances to step S1001. The application group 403 includes applications of the facade framework 402 itself and virtual applications on the target frameworks. It is identified in step S1001 if the selected application in the facade framework application group 403 is a virtual application of that on the target framework. This identification processing is done based on an application attribute object shown in FIG. 11. Note that the facade framework 402 and target frameworks may be prepared in different devices.

Figure 11:
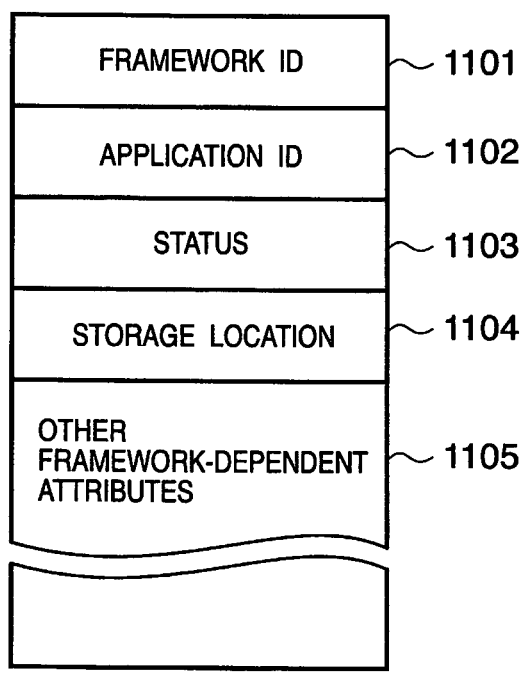
FIG. 11 shows the configuration of an application attribute object of an application group 403 managed by the facade framework 402.

FIG. 11 shows the configuration of the application attribute object of the application group 403 managed by the facade framework 402.

As shown in FIG. 11, the application attribute object includes the following information:

a framework identifier 1101 indicating a framework which executes the entity of the application;

an application identifier 1102 indicating an application defined as an object of the Application interface;

status 1103 indicating the lifecycle status of the application;

a storage location 1104 indicating the location where the application is actually stored as URL information; and other attributes 1105.

Attribute values for the application on the target framework are acquired and set from the acquired Application object when the application is installed (step S806).

If the framework identifier 1101 is set, it indicates that the designated application is an application on the target framework having the set identifier. If no framework identifier 1101 is set it indicates that the designated application is an application on the facade framework 402.

If it is determined in step S1001 that the selected application is that on the facade framework 402, the flow advances to step S1002; otherwise, the flow advances to step S1003.

In step S1002, since the selected application is an application which is actually running on the facade framework 402, application stop processing in original application management of the facade framework 402 is executed.

In step S1003, an application manager corresponding to the target framework which is selected by the framework identifier 1101 of the application attribute object and on which the application is actually running is acquired. The acquisition method in this step is as has been described in step S804.

It is then checked in step S1004 if the application manager can be acquired. If the application manager can be acquired, the flow advances to step S1005; otherwise, an exception is generated, thus ending the processing.

In step S1005, the designated application which is running on the target framework is stopped. More specifically, the application identifier stored in the application identifier 1102 is designated as an argument with respect to the application manager acquired in step S1003 to call a stop method.

At the same time, the flow advances to step S1002 to stop the virtual application on the facade framework 402.

As described above, the lifecycle management associated with the application on the target framework can be done as if that of an application on the facade framework 402 were made when viewed from the operator.

When the application attribute object of the application on the facade framework 402 is generated, it is stored in the secondary storage unit 303 at the same time. After that, when the device 500 is started, the application attribute object is loaded from the secondary storage unit 303 and is restored.

Therefore, once the application is installed via the facade framework 402, its information is restored in a state in which the device 500 was shut down previously every time the device 500 is started.

At this time, in the start sequence of the facade framework, when restoration processing is executed for the virtual application on the facade framework 402, the following processing is done.

When the status of the application stored in the application attribute object of the virtual application is different from that on each target framework, the status of the application on the target framework is changed. That is, the facade framework 402 changes the status of the application on the target framework via the corresponding application manager to match that of the virtual application on the facade framework 402.

For example, although the status indicating a start state is stored on the facade framework 402, if the corresponding application is not started on the target framework, that status is changed to the start state by a start method of the application manager.

Second Embodiment

The second embodiment according to the present invention will be described in detail below with reference to the accompanying drawings. Note that the arrangements of the device and software in the second embodiment are the same as those in the first embodiment, and a description thereof will be omitted. Also, the facade framework and target frameworks may be prepared in different devices.

The difference from the first embodiment in the second embodiment is the processing of the facade framework 402 and application manager when the device 500 is started.

When the device 500 is started, and the facade framework 402 is started accordingly, the facade framework application group 403 is initialized. In this case, when the framework identifier of the application attribute object as the virtual application is set, that virtual application is not reproduced as that on the facade framework 402 without reconstructing the application.

In place of inhibiting reproduction at that time, the application attribute object is not stored in the secondary storage unit 303 in case of the virtual application, thus obtaining the same effect.

On the other hand, when the application manager is started by the facade framework 402, a list of application identifiers of applications which are running on each target framework is acquired. The list of application identifiers is acquired by sending an inquiry to the target framework to be managed by the application manager.

Using the application identifiers on the acquired list, virtual applications are generated on the facade framework 402. The processing in this case is that described in step S806 of the first embodiment.

In this manner, the application management on the target framework can be done as if the application on the facade framework 402 were managed.

Third Embodiment

The third embodiment according to the present invention will be described in detail below with reference to the accompanying drawings. Note that the arrangements of the device and software in the third embodiment are the same as those in the first embodiment, and a description thereof will be omitted. Also, the facade framework and target frameworks may be prepared in different devices.

Figure 12:
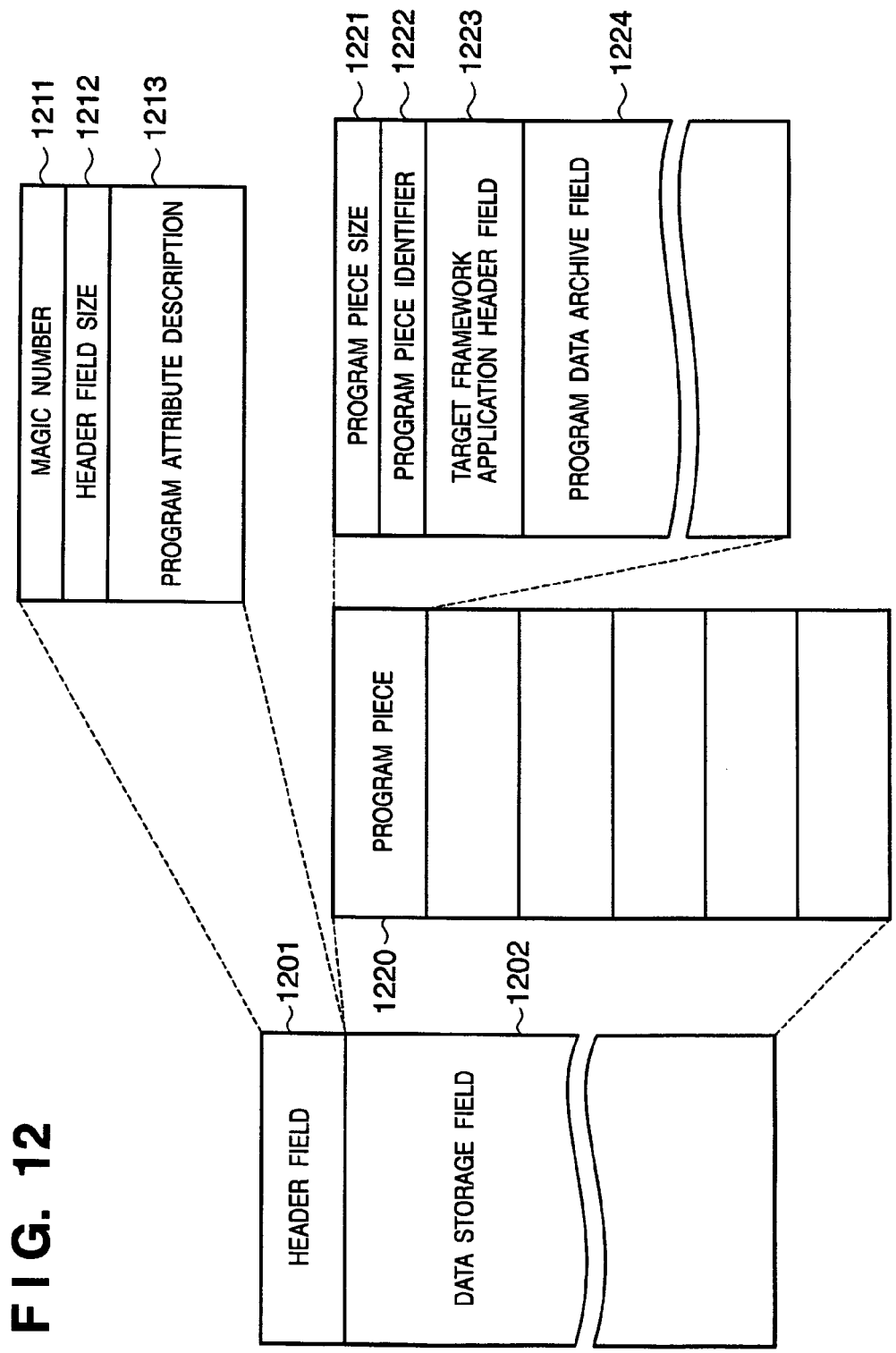
FIG. 12 shows the format of an application file used in the third embodiment.

FIG. 12 shows the format of an application file used in the third embodiment. As shown in FIG. 12, the application file combines application which run on a plurality of target frameworks including the facade framework 402 into one file. The application file includes a header field 1201 and data storage field 1202. The header field 1201 includes a magic number 1211 indicating the application file, a header field size 1212 indicating the size of the header field, and a program attribute description field 1213 which describes various attributes of the application program. Note that the program attribute description field 1213 includes XML data shown in FIG. 13, which expresses program attributes.

Furthermore, the data storage field 1202 is encrypted so as to allow decryption by only a secret key managed by the facade framework 402. When the data storage field 1202 is decrypted, it is made up of a sequence of program pieces 1220 as applications for target frameworks. Each program piece 1220 includes a size 1221 of that program piece 1220, a program piece identifier 1222, a target framework application header field 1223, and a program data archive field 1224. The target framework application header field 1223 describes attributes required at the time of execution on the target framework of interest. The program data archive field 1224 stores program data to be executed on the target framework.

Processing executed upon installing an application in the third embodiment will be described below using FIG. 14. Assume that an application on the facade framework 402 has an ApplicationAttribute object shown in FIG. 15 as an attribute.

Figure 14:
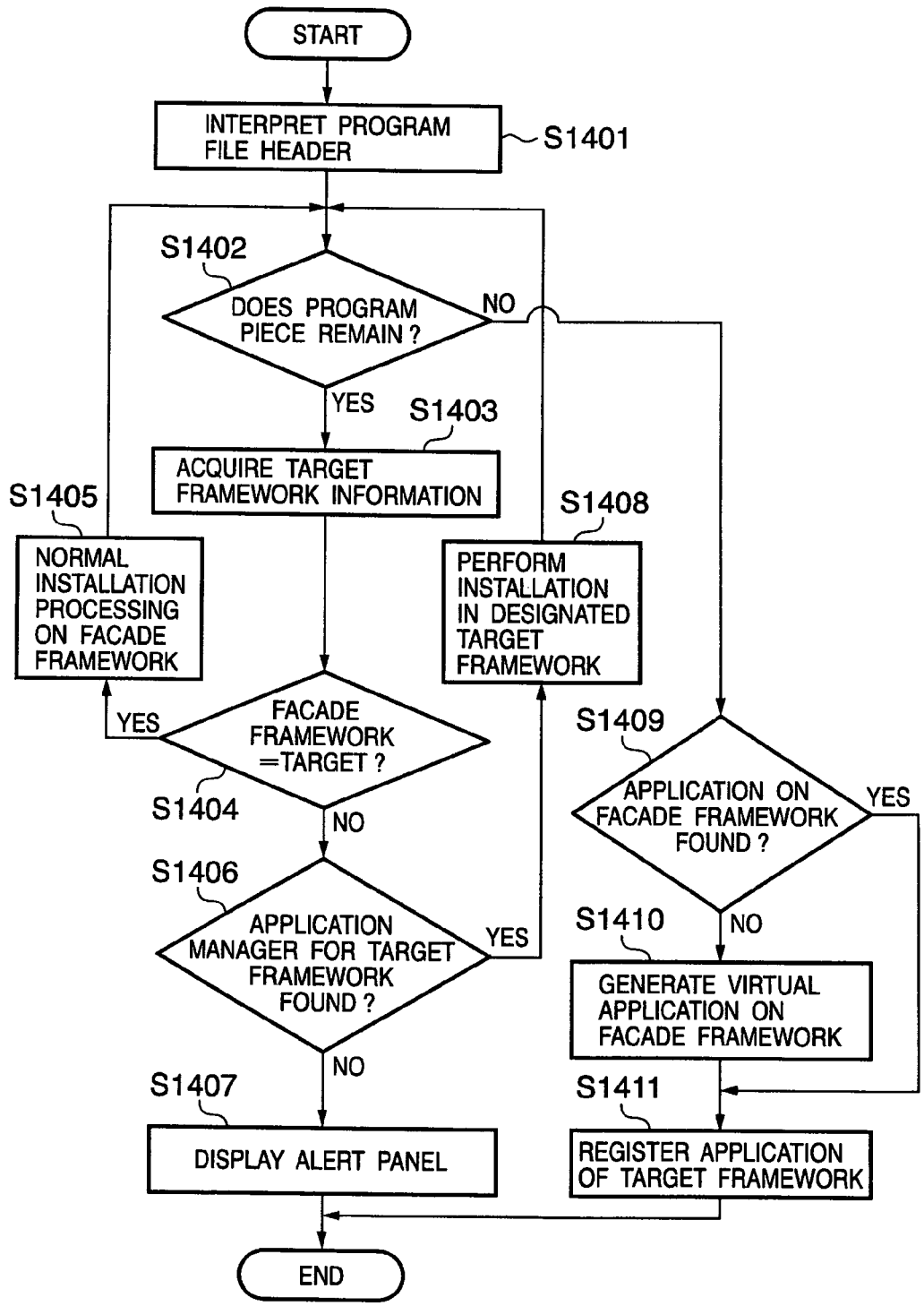
FIG. 14 is a flowchart showing installation processing in the third embodiment.

FIG. 14 is a flowchart showing the installation processing in the third embodiment. In step S1401, the following processing is executed as in the first embodiment. That is, upon reception of the application file 520 in response to the operator's instruction, the facade framework 402 parses an XML document described in the program attribute description field 1213 in the header field 1201 of that application file 520. At the same time, the facade framework 402 decrypts the data storage field 1202.

Information of each program piece 1220 is described using a "portion" tag as in the program attribute description example shown in FIG. 13. A target framework which is to execute the application program stored in the program data archive field 1224 of the program piece 1220 is described as a target attribute in the portion tag. When no target attribute is set or when the facade framework 402 is designated, the facade framework 402 is recognized as a target framework. When the identifier of the program piece 1220 is designated as an id attribute of the portion tag and is compared with the program piece identifier 1222, the program piece 1220 corresponding to the target framework is specified. Note that all pieces of program piece information are registered as a program piece list.

In step S1402, each program piece is processed using the program piece list generated in step S1401. A program piece to be processed is extracted from the list, and if the program piece to be processed remains, the flow advances to step S1403 to acquire target framework information from the program piece information acquired from the program piece information list.

It is checked in step S1404 if the target framework information acquired in step S1403 is not set, i.e., if the facade framework 402 is a target. If the facade framework 402 is a target, the flow advances to step S1405. In step S1405, a program stored in the program data archive data field 1224 of the program piece of interest is installed as an application for the facade framework 402. At this time, an ApplicationAttribute object is generated to manage the application attribute of the installed application.

If the facade framework 402 is not a target, the flow advances to step S1406. In step S1406, the same processing as in step S804 in the installation processing of the first embodiment is executed to acquire an application manager for the target framework of interest. Information required to acquire the application manager is acquired from the program piece information. Note that the facade framework 402 and target frameworks may be prepared in different devices.

If the application manager cannot be acquired and null is returned, the flow advances to step S1407. In step S1407, an alert page indicating that no application manager corresponding to the target framework designated as an installation destination of the application is registered is displayed on the Web browser on the computer 510. This alert page informs the operator that the installation has failed.

If the application manager can be acquired, the flow advances to step S1408 to install in the target framework. More specifically, data in the program data archive field 1224 of the program piece is opened as an input stream, and an install method of the application manager is called out to have that stream as an argument. Upon completion of installation in the target framework, an object that implements the Application interface shown in FIG. 9 is returned. This object includes an application identifier used to uniquely recognize applications installed in the target framework. The application identifier can be acquired by calling a getApplicationID method of the Application interface.

An application list is generated (as a Vector object of Java) if it is not generated. The Application object returned as installation in the target framework is registered in the application list.

On the other hand, if it is determined in step S1402 that no program piece remains, the flow advances to step. S1409. If it is determined in step S1409 that the application on the facade framework 402 is installed in step S1405, the flow jumps to step S1411; otherwise, the flow advances to step S1410.

In step S1410, a virtual application is generated on the facade framework 402, and an application information object is generated. At this time, an ApplicationAttribute object is generated to manage an application attribute.

In step S1411, the application list registered with information of the application installed in the target framework in step S1408 is set in a frameworkList field of the ApplicationAttribute object. This ApplicationAttribute object is generated when the application is installed in the facade framework 402 in step S1405 or together with the virtual application in step S1410.

In this way, when the application file 520 which includes applications for a plurality of target frameworks is designated, installation in respective target frameworks is completed. Also, the application information object is generated on the facade framework as a representative of these applications.

In the third embodiment, program pieces stored in one application file 520 are managed as related ones. However, virtual applications may be generated in correspondence with respective program pieces which are not related to each other, and may be managed as independent ones.

Processing other than installation will be described below. Respective processes other than installation are roughly the same, and the stop processing will be described using FIG. 16 as a representative example.

Figure 16:
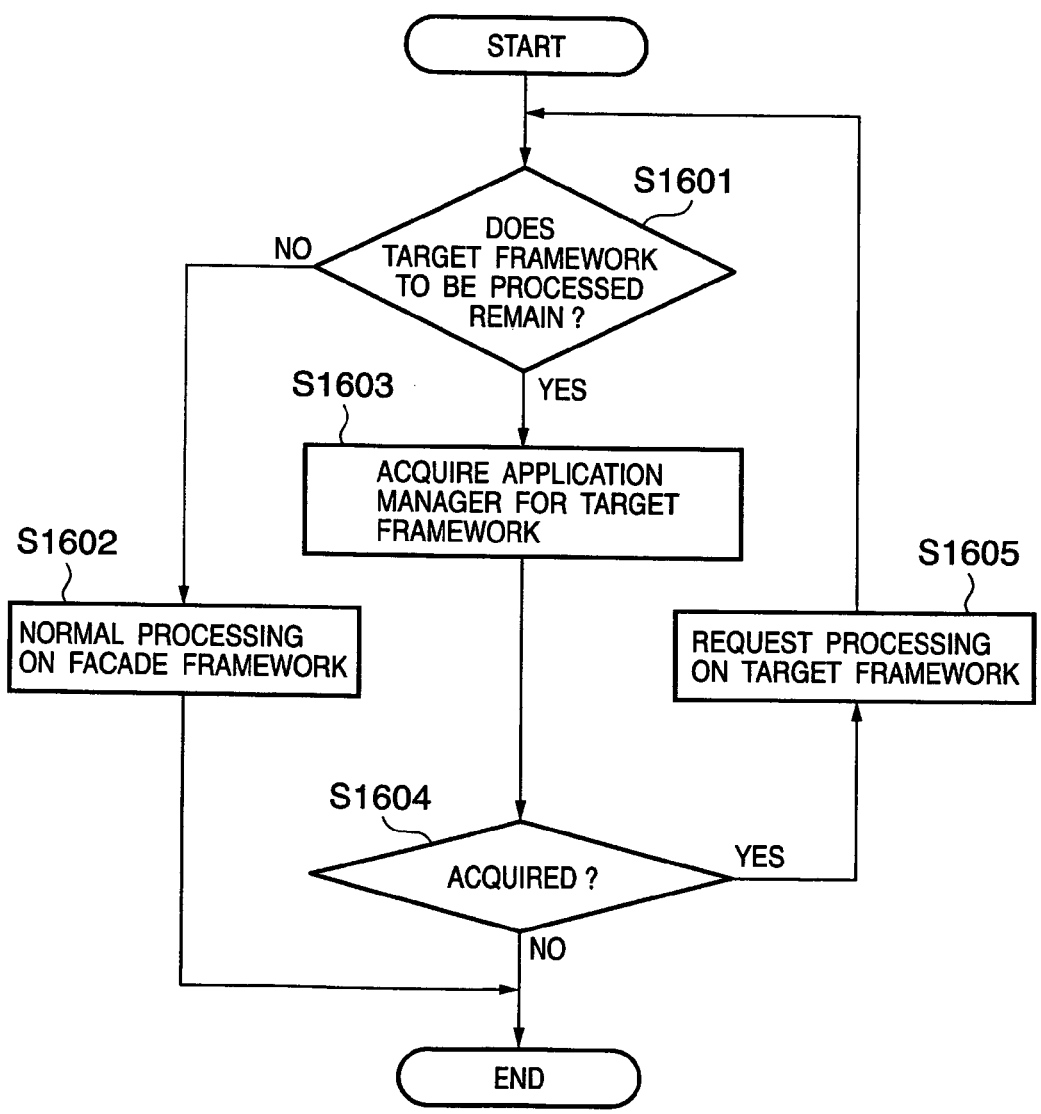
FIG. 16 is a flowchart showing the stop processing of an application in the third embodiment.

FIG. 16 is a flowchart showing the stop processing of an application in the third embodiment. As in the aforementioned installation processing, the operator accesses the facade framework 402 from the computer 510 to display the management window of the application group 403 of the facade framework 402 on the Web browser. When the operator selects an application from the displayed management window and instructs to perform stop processing, the flow advances to step S1601. In step S1601, an ApplicationAttribute object is extracted from the designated application in the facade framework application group 403, and the contents of the frameworkList field of that ApplicationAttribute object are acquired. Also, a FrameworkProgram object is extracted from a Vector object.

If all FrameworkProgram objects have already been extracted, the flow advances to step S1602 to execute application stop processing in original application management of the facade framework 402.

If FrameworkProgram objects to be extracted still remain, the flow advances to step S1603. In step S1603, a value of a frameworkId field as a target framework identifier is acquired from the FrameworkProgram object extracted in step S1601. Also, an application manager corresponding to the target framework which is selected by the value of the frameworkId field as the target framework identifier is acquired. This acquisition method is the same as in the first embodiment, and a description thereof will be omitted. Note that the facade framework 402 and target frameworks may be prepared in different devices.

It is then checked in step S1604 if the application manager can be acquired. If the application manager cannot be acquired, an exception is generated, thus ending processing. If the application manager can be acquired, the flow advances to step S1605 to stop the designated application which is running on the target framework. More specifically, the application identifier stored in an applicationId field of the FrameworkProgram object is designated as an argument with respect to the application manager acquired in step S1603 to call a stop method.

As described above, applications on different frameworks, which are stored in one application file 520, can undergo lifecycle management. Furthermore, this lifecycle management can be made in synchronism with that of applications on the facade framework 402.

In each of the above embodiments, storage of applications in one application file 520 is a condition for collaboration. However, separately installed applications may be grouped after installation to be consolidated as those on the facade framework 402, thus obtaining the same effects.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which stores the program code constitutes the present invention.

As the recording medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-144225, filed May 17, 2005, which is hereby incorporated by reference herein in its entirety.

What is claimed is:

1. A managing method executed by a managing framework included in a plurality of frameworks, the managing framework for managing applications in the plurality of frameworks, wherein the plurality of frameworks operates on an operating system, comprising:
   a step of receiving an install instruction for installing the application from an operator;
   a step of acquiring the application to be installed;
   a step of analyzing information attached to the application to be installed;
   a determination step of determining, based on a result of analyzing the information attached to the application, a target framework for installation, wherein the target framework for installation is one of the plurality of frameworks including the managing framework;
   an installation step of installing the application in a framework other than the managing framework or in the managing framework, in accordance with the target framework determined in the determination step, wherein if the target framework is not the managing framework, the installation step searches for an application manager corresponding to the target framework and calls an install method of the application manager to install the application in the target framework;
   a step of generating a virtual application on the managing framework, if the target framework is not the managing framework, the virtual application corresponding to the installed application and lifecycle management of the installed application is performed for the virtual application;
   a step of starting the application installed in the one of the plurality of frameworks in accordance with a start instruction; and
   a step of stopping the application in accordance with a stop instruction.

2. The method according to claim 1, wherein, when an application on the framework other than the managing framework is selected, processing is requested to the framework other than the managing framework in which the selected application has been installed.

3. The method according to claim 1, wherein the application on the framework other than the managing framework is managed by the managing framework.

4. The method according to claim 1, wherein grouped applications on the plurality of frameworks are managed.

5. The method according to claim 1, wherein the application manager is treated as an application on the managing framework by the managing framework.

6. The method according to claim 1, wherein a search method provided by the managing framework is used to search for the application manager.

7. The method according to claim 1, further comprising a step of managing, by a manager which is one of a plurality of applications executed on the managing framework, the application installed in the framework other than the managing framework.

8. The method according to claim 1, wherein the plurality of frameworks are handled as applications, which run on an operating system, by the operating system.

9. An information processing apparatus comprising an operating system and a plurality of frameworks operating on the operating system, wherein the plurality of frameworks includes a managing framework for managing applications in the plurality of frameworks, the managing framework comprising:
   receiving means for receiving an install instruction for installing the application from an operator;
   acquisition means for acquiring the application to be installed;
   analyzing means for analyzing information attached to the application to be installed;
   determination means for determining, based on a result of analyzing the information attached to the application, a target framework for installation, wherein the target framework for installation is one of the plurality of frameworks including the managing framework;
   installation means for installing the application in a framework other than the managing framework or in the managing framework, in accordance with the target framework determined by the determination means, wherein if the target framework is not the managing framework, the installation means searches for an application manager corresponding to the target framework and calls an install method of the application manager to install the application in the target framework;
   generation means for generating a virtual application on the managing framework, if the target framework is not the managing framework, the virtual application corresponding to the installed application and lifecycle management of the installed application is performed for the virtual application;
   starting means for starting the application installed in the one of the plurality of frameworks in accordance with a start instruction; and
   stopping means for stopping the application in accordance with a stop instruction.

10. The apparatus according to claim 9, wherein, when an application on the framework other than the managing framework is selected, processing is requested to the framework other than the managing framework in which the selected application has been installed.

11. The apparatus according to claim 9, wherein the managing framework further comprises management means for managing the application on the framework other than the managing framework.

12. The apparatus according to claim 9, wherein the managing framework further comprises management means for managing grouped applications on the plurality of frameworks.

13. The apparatus according to claim 9, wherein the application manager is treated as an application on the managing framework by the managing framework.

14. The apparatus according to claim 9, wherein a search method provided by the managing framework is used to search for the application manager.

15. The apparatus according to claim 9, wherein one of a plurality of applications executed on the managing framework is a manager for managing the application installed in the framework other than the managing framework.

16. The apparatus according to claim 9, wherein the plurality of frameworks are handled as applications, which run on an operating system, by the operating system.

17. A non-transitory computer-readable storage medium storing a computer program for implementing a managing method executed by a managing framework included in a plurality of frameworks, the managing framework for managing applications in the plurality of frameworks, wherein the plurality of frameworks operates on an operating system, the method comprising:
a step of receiving an install instruction for installing the application from an operator;
a step of acquiring the application to be installed;
a step of analyzing information attached to the application to be installed;
a determination step of determining, based on a result of analyzing the information attached to the application, a target framework for installation, wherein the target framework for installation is one of the plurality of frameworks including the managing framework;
an installation step of installing the application in a framework other than the managing framework or in the managing framework, in accordance with the target framework determined in the determination step, wherein if the target framework is not the managing framework, the installation step searches for an application manager corresponding to the target framework and calls an install method of the application manager to install the application in the target framework;
a step of generating a virtual application on the managing framework, if the target framework is not the managing framework, the virtual application corresponding to the installed application and lifecycle management of the installed application is performed for the virtual application;
a step of starting the application installed in the one of the plurality of frameworks in accordance with a start instruction; and
a step of stopping the application in accordance with a stop instruction.

18. The non-transitory computer-readable storage medium according to claim 17, wherein, when an application on the framework other than the managing framework is selected, processing is requested to the framework other than the managing framework in which the selected application has been installed.

19. The non-transitory computer-readable storage medium according to claim 17, wherein the application on the framework other than the managing framework is managed by the managing framework.

20. The non-transitory computer-readable storage medium according to claim 17, wherein the application manager is treated as an application on the managing framework by the managing framework.

21. The non-transitory computer-readable storage medium according to claim 17, wherein a search method provided by the managing framework is used to search for the application manager.

22. The non-transitory computer-readable storage medium according to claim 17, further comprising a step of managing, by a manager which is one of a plurality of applications executed on the managing framework, the application installed in the framework other than the managing framework.

* * * * *